Oct. 24, 1933. W. S. ROTHERHAM Re. 18,978

WIRE STRIPPING MACHINE

Original Filed May 8, 1930 2 Sheets-Sheet 1

Oct. 24, 1933. W. S. ROTHERHAM Re. 18,978

WIRE STRIPPING MACHINE

Original Filed May 8, 1930 2 Sheets-Sheet 2

W. S. Rotherham
Inventor

By F. D. Cross
Attorney

Reissued Oct. 24, 1933

Re. 18,978

UNITED STATES PATENT OFFICE 18,978

WIRE STRIPPING MACHINE

Walter S. Rotherham, Bloomingdale, N. J., assignor to E. I. du Pont de Nemours & Company, Wilmington, Del., a corporation of Delaware Original No. 1,882,947, dated October 18, 1932, Serial No. 450,799, May 8, 1930. Application for reissue August 19, 1933. Serial No. 685,971

9 Claims. (Cl. 81—9.51)

This invention relates to an improved process of and machine for removing combustible coverings, such as insulation and the like, from electric wires, and more particularly to a process and machine for burning and stripping insulation from the ends of insulated conductors and the like.

In the preparation of insulated wires for use in the manufacture of certain articles such as detonators and the like, it has been the practice to cut or burn a groove in the insulation by electric means a short distance from one end at a time and then remove the insulation from the groove to the end of the wire for convenience in connecting to the detonators or for short-circuiting the ends.

The processes or machines heretofore proposed for this purpose have had the disadvantage that if the insulation was removed from conducting wires by cutting means the wires themselves were nicked or cut, causing them to be easily broken in subsequent operations. There is the further disadvantage that by using such a cutting means, or by burning a groove in the insulation by means of an electrically heated element, the insulation has a tendency to unravel and besides causes frayed ends.

An object of the present invention is to overcome the disadvantages of prior processes and machines for removing insulation from conductor wires.

A further object of this invention is to remove insulation from conductor wires by a process capable of large scale production with economy in time and labor.

A still further object of my invention is to strip the insulation from conductor wires in such a manner that the ends of the insulation are even and firm so as to facilitate subsequent operations.

Other objects will appear as the description proceeds.

These objects are accomplished by the following invention in which I have found that the wires from which the insulation is to be removed from at least a portion of their ends may be subjected to the operations in sequence necessary to produce the most desired product with the least amount of labor and handling of the wires. With this end in view my process and apparatus contemplates that a multiplicity of the wires be subjected to the various essential operations for this purpose at the same time.

According to my invention a multiplicity of the wires may be subjected to the burning action and automatically to the stripping means simultaneously. In this manner great economy in operation, labor, and production results.

As a more specific embodiment of my invention, and without limiting it thereto, my invention may be described more specifically as follows:

Figure 6 represents the retaining or clamping means 18, shown in Figure 3, and consists of two members operated by the lever 18*a*, having an eccentric which forces the two plates to the position shown in Figure 7, thus gripping and holding the wires.

Figure 7 illustrates the clamping plates in their wire gripping and holding position.

Figure 8 illustrates in greater detail a slotted cross-head or scotch yolk, well known in the art, which operates the fingers shown in Figure 5.

I preferably draw a number of the wires across a table or other plane surface, engage the wires as a single unit by a clamping or gripping means, at each end of the desired lengths, cut off the wires, transfer the unit, consisting for example of 12 wires, with the clamping or retaining means engaging the wires a short distance from the ends, insert the clamping or retaining means in grooves in the table whereby the unit is conveyed across the surface of the table by chain conveyor or other conveyor means. As the wires are conveyed automatically across the table the ends are subjected to the step of removing the insulation from a short length of the wires near their ends. This is done by first passing the wires over a narrow flame, or other heating means, which plays upon each of the wires as they are conveyed laterally across the table. This operation burns a section of the insulation around each of the wires. The wires pass then through the jaws of the stripping means which engage a number of the wires at one time and automatically strip the insulation from the burned or charred section to the ends of each of the wires. The wires are then passed through a coating solution, whereby the ends of the insulation remaining on the wires are properly coated to prevent fraying in subsequent operations. This coating material may be shellac, varnish, or the like and may be automatically sprayed upon the ends of the unremoved insulation or the ends may be passed through an automatic feeder such as is used in the dispensing of liquids.

It will be understood that variations and modifications may be made in the process and apparatus without departing from the spirit or scope of my invention.

My invention also contemplates treating the wires as they are drawn from the spools or reels with an impregnating material to complete an important step in the manufacture of the insulated wires previous to cutting the wires in the proper lengths before removing the insulation from the ends.

Figure 1:
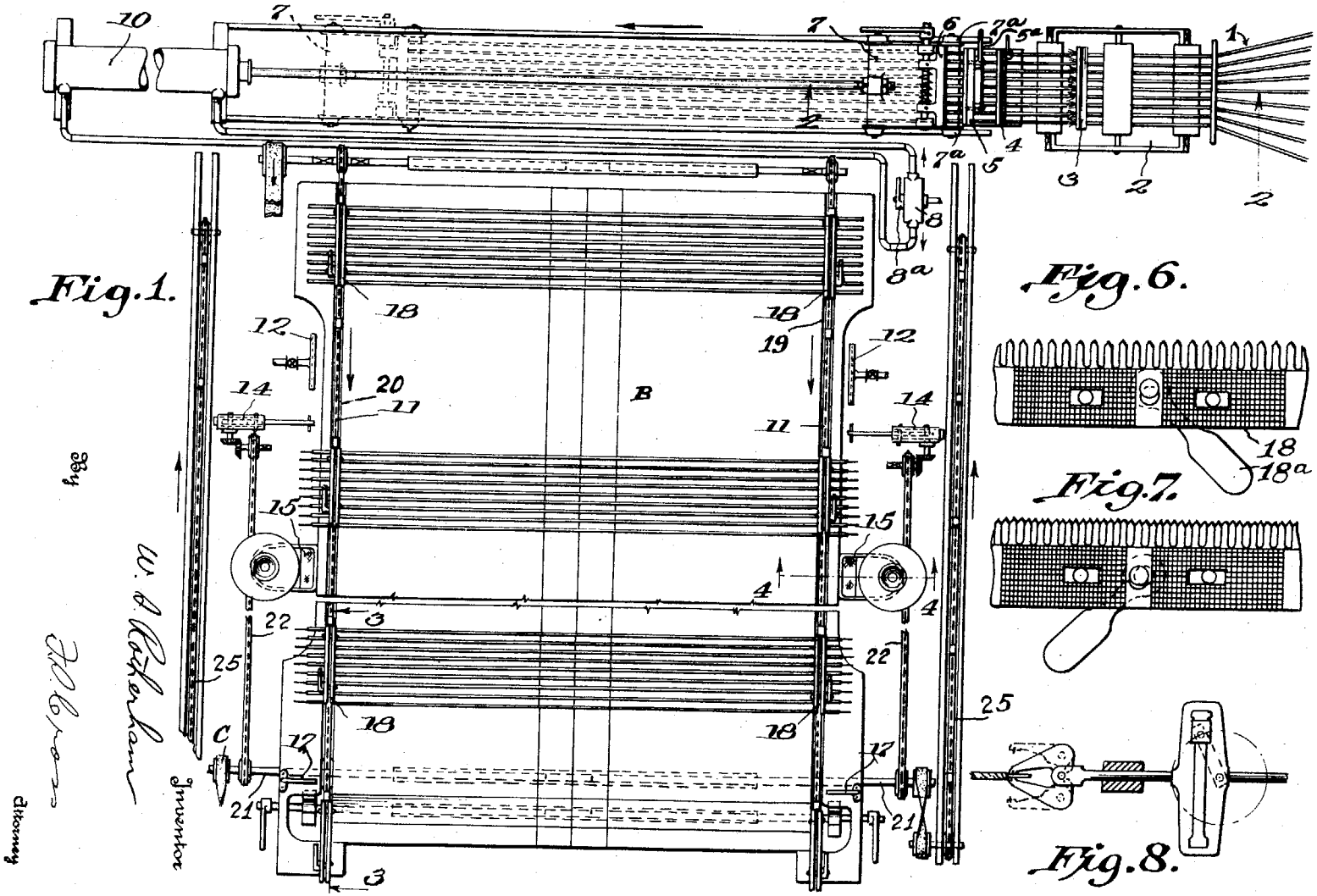
Figure 1 illustrates the plan view of the preferred embodiment of my invention.
Figure 2:
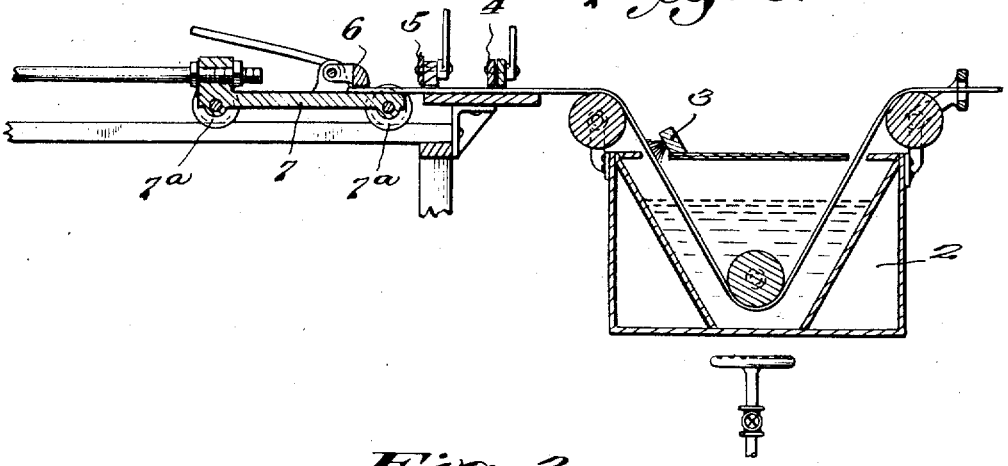
Figure 2 is a sectional view, taken on line 2—2 of Figure 1, of the wax impregnating tank through which the wires are drawn, together with a sectional view of the clamping or retaining means carried by the carriage.
Figure 3:
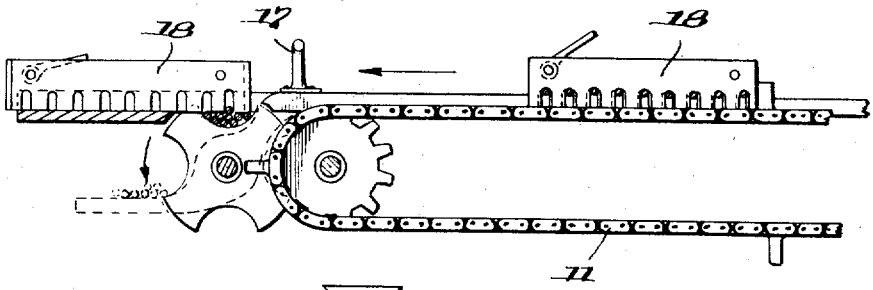
Figure 3 is a side view, taken on line 3—3 of Figure 1, of the conveyor means and shows a clamp engaging wires in place and a second clamp from which the stripped and treated wires are being removed.
Figure 4:
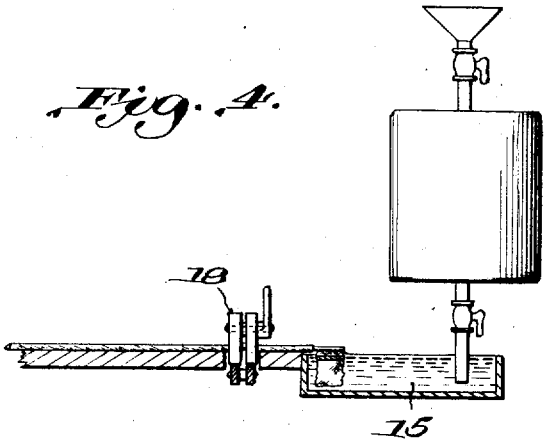
Figure 4 is a view taken on line 4—4 of Figure 1 and illustrates the means for shellacking or otherwise treating the ends of the insulated wires from which portions of the insulation have been removed.
Figure 5:
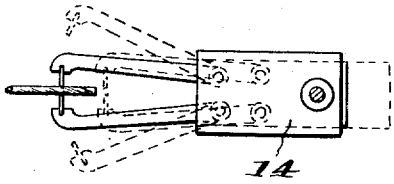
Figure 5 shows the stripping means which engages the portion of the insulation to be removed.

In the accompanying drawings the numeral 1 represents a number of insulated wires drawn from spools or reels or the like supported on a rack or frame adapted to support a large number of similar spools or reels of the insulated wire so that a multiplicity may be in use at one time with a reserve at hand. The numeral 2 represents a wax impregnating tank through which the insulated wires are drawn. This tank 2 may be heated by any suitable means, so as to keep the wax (for example paraffin) in solution. The insulated wires are then drawn from the tank 2 through a wiper 3 which removes any surplus wax from the wires and then over a roller by means of a carriage 7. This carriage moves on rollers 7*a* back and forth across a raised surface of the table B by means of the air ram 10. This ram 10 is controlled by an operator by means of the carriage operating valve 8 and lever 8*a*. The carriage 7 is adapted by means of the clamping means 6 to engage the ends of the insulated wires as they protrude through stationary clamping means 4, and cutting means or shear 5 operated by the lever 5*a*. Upon operation of the valve 8 the ram draws the carriage across the table to the position shown in dotted lines. Clamping means 18 are then inserted over the wires at each end so as to engage them in spaced relation in the clamping means. The stationary clamp 4 engages and holds the ends of the wires extending from the reels while the severed pieces with their retaining or clamping means 18 are transferred to the conveyor; the shearing means severs the wires, and the operator releases them from the clamping means 6. The clamping means with the group of wires retained therein are then placed in the grooves 19 and 20 of table B and are engaged by the conveyor chain 11, the wires extending across the table in the position shown in Figure 1 of the drawings. The conveyor chains carry the ends of the wires across the narrow flame at 12 which burns a narrow section of the insulation. The ends of the wires are next subjected to the action of the stripping means 14 which removes the insulation from the ends of the wires. The ends of insulation remaining on the wires are then subjected to a douche or spray of shellac or like material from the tanks 15.

After the wires have been conveyed past the coating tank, the clamping means 18 may be removed, with the wires engaged therein or the wires may be pushed out of the clamping means by the bundling lever 17, into the cylindrical means having pockets sufficiently large to accommodate a substantial number of the wires. The wires may then be tied into bundles and are ready for packing or shipment.

The driving means for the conveyor chain also operates the stripping means.

It will be apparent from the foregoing that various modifications of my process and apparatus may be made within the scope of my invention.

The table may be so constructed as to be adjustable to different widths depending upon the lengths of the wires desired. This may be done by inserting additional leaves of sheet metal or the like forming the plane surface of the table. Other parts of the machine may likewise be made adjustable. The burning means may be a narrow sheet of flame produced by a combustible gas, electrical or other heat producing means.

The shaft 21, driven by the belt C, in turn operates and drives the stripping means mechanism 14, by the gear chain 22, and also operates the conveyor 25. This conveyor carries the clamping or retaining means 18 to the operators on the opposite side of the table in the direction indicated by the arrow in Figure 1.

I claim:

1. In the process of removing combustible insulation from conductor wires, the steps which comprise clamping a multiplicity of the wires in spaced relation, passing the wires transversely of their length through a heated zone of sufficiently high temperature to burn circumferential sections of the insulation around the wires, and stripping the insulation from the ends of the wires.

2. In the process of removing combustible insulation from conductor wires, the steps which comprise clamping a multiplicity of the wires in spaced relation, passing the wires transversely of their length through a heated zone of sufficiently high temperature to burn circumferential sections of the insulation around the wires, stripping the insulation from the ends of the wires, and applying a coating material to the ends of the unremoved insulation.

3. In the process of removing combustible insulation from conductor wires, the steps which comprise drawing a multiplicity of the wires in spaced relation over a substantially plane surface, clamping the multiplicity of wires in said spaced relation, cutting the wires into predetermined lengths, passing the wires transversely of their length through a heated zone of sufficiently high temperature to burn circumferential sections of the insulation around the wires and stripping the insulation from the ends of the wires.

4. In the process of removing combustible insulation material from conductor wires, the steps which comprise drawing a multiplicity of the wires in spaced relation over a substantially plane surface, clamping the multiplicity of wires in said spaced relation, cutting the wires into predetermined lengths, passing the ends of the wires transversely of their length through a heated zone of sufficiently high temperature to burn circumferential sections of the insulation around the wires, stripping the insulation from the groove to the ends of the wires from the wires and applying a coating material to the ends of the unremoved insulation.

5. In the process of removing combustible insulation material from conductor wires, the steps which comprise drawing a multiplicity of wires through a coating solution and on to a substantially plane surface, clamping the multiplicity of wires in said spaced relation cutting the wires into predetermined lengths, passing the wires transversely of their length through a heated zone of sufficiently high temperature to burn circumferential sections of the insulation around the wires, and stripping the insulation from the ends of the wires.

6. In a wire stripping machine, a carriage wire clamp, a stationary wire clamp for engaging a multiplicity of wires, means for moving the carriage clamp, shearing means on the stationary clamp, means for releasing the clamp, and means for conveying the clamps in a substantial horizontal plane, means for burning substantially circumferential sections of the insulation near the ends of the wires, and means for removing the insulation from said ends.

7. In a wire stripping machine, a table, clamps for engaging a multiplicity of insulation wires, a conveyor means for the clamps, means for burning substantially circumferential sections of the insulation material, and stripping means for removing the insulation from the ends of the wires.

8. In a wire stripping machine, a table, clamps for engaging a multiplicity of insulation wires, means for conveying the clamps and wires across the surface of the table, means in the path of the wires for burning substantially circumferential sections about the wires near their ends, stripping means for removing the insulation from the ends of the wires, and means for coating the ends of the insulation remaining on the wires.

9. In a wire stripping machine, a surface or table, clamps engaging a multiplicity of wires and adapted to engage a groove near each end of the table, a conveyor means operating in the grooves adapted to engage the clamping means, a heating means at each end of the table for burning substantially circumferential sections of the insulation near the ends of the wires, stripping means at each end of the table in the path of the movement of the wires for engaging the insulation and removing it from the ends of the wires, and driving means for operating the conveyor means and the stripping means.

WALTER S. ROTHERHAM.